Mar. 6, 1923.
H. W. POWERS.
WHEEL RIM.
FILED AUG. 27, 1920.
1,447,687.
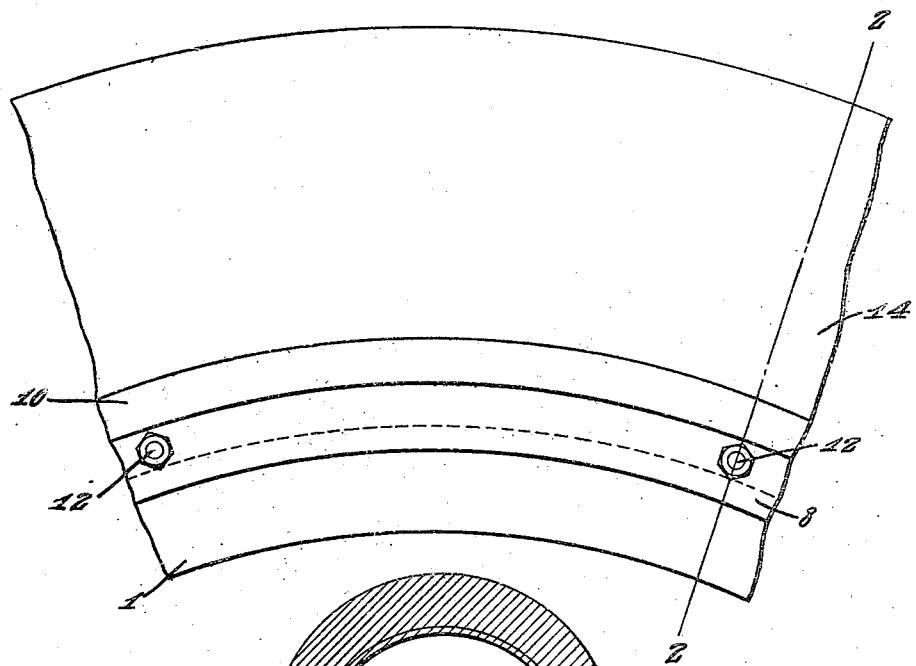
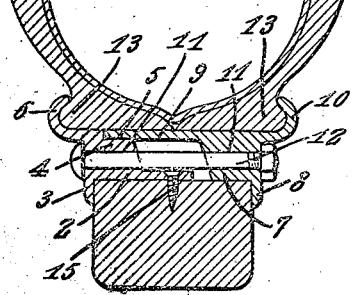

Patented Mar. 6, 1923.

1,447,687

UNITED STATES PATENT OFFICE.

HARRY W. POWERS, OF NORTHWEST, VIRGINIA.

WHEEL RIM.

Application filed August 27, 1920. Serial No. 406,298.

*To all whom it may concern:*

Be it known that I, HARRY W. POWERS, a citizen of the United States, residing at Northwest, in the county of Norfolk and State of Virginia, have invented a new and useful Wheel Rim, of which the following is a specification.

This invention relates to wheel rims, one of its objects being to provide a rim formed of opposed rings one of which is adapted to be fixedly attached to the felly of a wheel while the other is adjustably mounted, the two rings cooperating to form means for engaging and holding a tire casing so that it cannot become accidentally disconnected from the wheel.

A further object is to provide rings which, when properly assembled, will grip the felly of the wheel and also present a broad smooth bearing for the rim engaging portion of the tire casing.

Another object is to provide a structure of this character which can be applied readily to a wheel and which will permit a tire to be changed quickly.

With the foregoing and other objects in view the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1 is a side elevation of a portion of a wheel rim and tire having the present improvements.

Figure 2 is a transverse section therethrough.

Referring to the figures by characters of reference; 1 designates a portion of the felly of a vehicle wheel, the same being of the usual construction. The rim constituting the present invention includes a band or ring 2 having an inwardly extending flange 3 at its outer edge adapted to lap one side of the felly, as shown. The outer side portion of the band 2 is thickened to provide an annular shoulder 4 in the outer surface of which is formed an annular depression 5 constituting a seat. An annular inwardly curved holding flange 6 is provided along the outer side of the band, as shown.

The rim also includes a removable band or ring 7 of a thickness equal to that of the band 2 and its thickened annular portion 4, and extending inwardly from the outer side of the band 7 is an annular flange 8 adapted to lap one side of the felly. An inwardly or laterally extending flange projects from the outer surface of the band 7, as shown at 9 and is adapted to extend into the seat 5. An annular inwardly curved holding flange is provided along the outer side of the band 7, as at 10 and is arranged oppositely to the flange 6.

Transverse holes 11 are formed in the two bands at desired intervals and are adapted to aline, there being bolts 12 insertible into these holes and adapted, when tightened, to draw the bands together so that the felly will be gripped between the flanges 3 and 8 while the beads 13 of the tire casing 14 will be gripped between the flanges 6 and 10. The band 2 is preferably attached permanently to the felly by screws 15 or the like. Obviously by loosening the bolts 12 the ring or band 7 can be removed and thus allow the tire to be changed quickly and easily.

What is claimed is:—

A wheel rim comprising a pair of cooperating felly and tire clamping bands, each equipped at its outer edge with a felly engaging flange extending inwardly and with an annular inwardly curved tire holding flange, one of said bands having a thickened portion at its inner side to provide an annular shoulder, said shoulder having an annular seat in its outer face, the other band corresponding in thickness to the first mentioned band and having a laterally extending flange to fit the seat in the shoulder of the first mentioned band, the thickness of said lateral flange and the depth of said seat being the same, whereby the outer faces of the bands are arranged flush with each other to provide a smooth tire receiving seat, and bolts extending through said felly engaging flanges beyond the felly whereby the bands are drawn together to grip the felly and clamp a tire.

In testimony that I claim the foregoing as my own, I have hereto affixed my signature in the presence of two witnesses.

HARRY W. POWERS.

Witnesses:
W. T. AYDLETT,
MARK HATHAWAY.